US007029183B2

(12) United States Patent
Melzak et al.

(10) Patent No.: US 7,029,183 B2
(45) Date of Patent: Apr. 18, 2006

(54) OPTICAL FIBER ARRAY CONNECTOR

(75) Inventors: Jeffrey M. Melzak, South Euclid, OH (US); Mehran Mehregany, Pepper Pike, OH (US)

(73) Assignee: FLX Micro, Inc., Cleveland, OH (US)

( * ) Notice: Subject to any disclaimer, the term of this patent is extended or adjusted under 35 U.S.C. 154(b) by 59 days.

(21) Appl. No.: 10/161,820

(22) Filed: Jun. 4, 2002

(65) Prior Publication Data

US 2003/0223700 A1 Dec. 4, 2003

(51) Int. Cl.
*G02B 6/38* (2006.01)

(52) U.S. Cl. ............................ 385/59; 385/53; 385/71

(58) Field of Classification Search .................. 385/90, 385/91, 59, 71, 89, 60, 55, 77, 53, 115, 120, 385/147
See application file for complete search history.

(56) References Cited

U.S. PATENT DOCUMENTS 3,597,659 A * 8/1971 Hoffman et al. ............ 361/808
3,985,975 A * 10/1976 Steensma .................... 379/274
5,590,229 A * 12/1996 Goldman et al. ............. 385/59
5,896,481 A * 4/1999 Beranek et al. ............... 385/90
6,012,852 A * 1/2000 Kadar-Kallen et al. ....... 385/74
6,482,593 B1 * 11/2002 Walt et al. ..................... 435/6

* cited by examiner

*Primary Examiner*—Karl D. Frech
(74) *Attorney, Agent, or Firm*—Matthew J. Evans; Squire, Sanders & Dempsey L.L.P.

(57) ABSTRACT

An optic array connector is disclosed. The fiber optic array includes a first faceplate having a plurality of openings. The first faceplate is oriented in a first direction. The fiber optic array also includes a second faceplate having a plurality of openings. The second faceplate is oriented in a second direction. A plurality of optical fibers are inserted through the plurality of openings in the first faceplate and the plurality of openings in the second faceplate. The second faceplate and the first faceplate are adjusted such that a portion of the openings in the first faceplate and a portion of the openings in the second faceplate contact and hold the optical fibers.

14 Claims, 7 Drawing Sheets

OPTICAL FIBER ARRAY CONNECTOR

FIELD OF THE INVENTION

This invention relates to optical fiber arrays and more particularly to high precision optical fiber array connectors.

BACKGROUND OF THE INVENTION

The use of optical fibers in communication systems is rapidly expanding due to the large bandwidth capabilities of optical fibers. With the development of optical cross connect switches, the use of optical fibers will increase. One challenge in construction of large-scale optical cross connect switches is that optical fibers must be precisely aligned to the switching element in order to allow for switching of an optional signal between optical fibers. Many current attempts to align and hold fibers work only for 1 dimensional arrays. One attempt to deal with this problem is discussed in U.S. Pat. No. 5,907,650 entitled "High Precision Optical Fiber Array Connector and Method" issued to Sherman et al. This patent discloses shaping the end of the optical fiber into a cone shape, inserting the cone shaped ends into openings in a mask to engage the surface wall and then bonding the fibers in place. This approach has drawbacks which include the requirement that the optical fibers must be processed such that one end of the optical fiber is essentially conical in shape.

SUMMARY OF THE INVENTION

Thus, a need has arisen for an improved optical fiber array connector that overcomes disadvantages associated with other connectors.

In one embodiment, a fiber optic array connector is disclosed. The fiber optic array includes a first faceplate having a plurality of openings with sidewalls. The first faceplate is oriented in a first direction. The fiber optic array also includes a second faceplate having a plurality of openings with sidewalls. The second faceplate is oriented in a second direction. Optical fibers are inserted through the plurality of openings in the first faceplate and the plurality of openings in the second faceplate. The second faceplate and the first faceplate are adjusted such that the sidewalls in the openings in the first faceplate and the sidewalls in the openings in the second faceplate contact and hold the optical fibers.

In another embodiment, an optical cross-connect switch is disclosed. Optical cross connect includes a fiber optic array having a plurality of optical fibers, the optical fibers held by an optical array connector. The optical array connector includes a first faceplate having a plurality of openings and a second faceplate having a plurality of openings. The plurality of openings in the first faceplate are aligned in a first direction. The plurality of openings in the second faceplate are aligned in a second direction. Optical fibers are inserted in to the plurality of openings in the first optical array and the openings in the second optical array. The second faceplate and the first faceplate are adjusted such that the optical fibers are secured against the openings of the first faceplate and the second faceplate.

Technical benefits of the present invention for an improved fiber array connector include a simplified way to hold an optical fiber. Also, using the fiber optic array of the present invention can be used to form a cross connect switch where the optical fibers are aligned with great accuracy.

Other technical benefits are apparent from the following descriptions, illustrations and claims.

BRIEF DESCRIPTION OF THE DRAWINGS

For a more complete understanding of the device and advantages thereof, reference is now made to the following descriptions in which like reference numerals represent like parts.

DETAILED DESCRIPTION OF THE DRAWINGS

Figure 1:
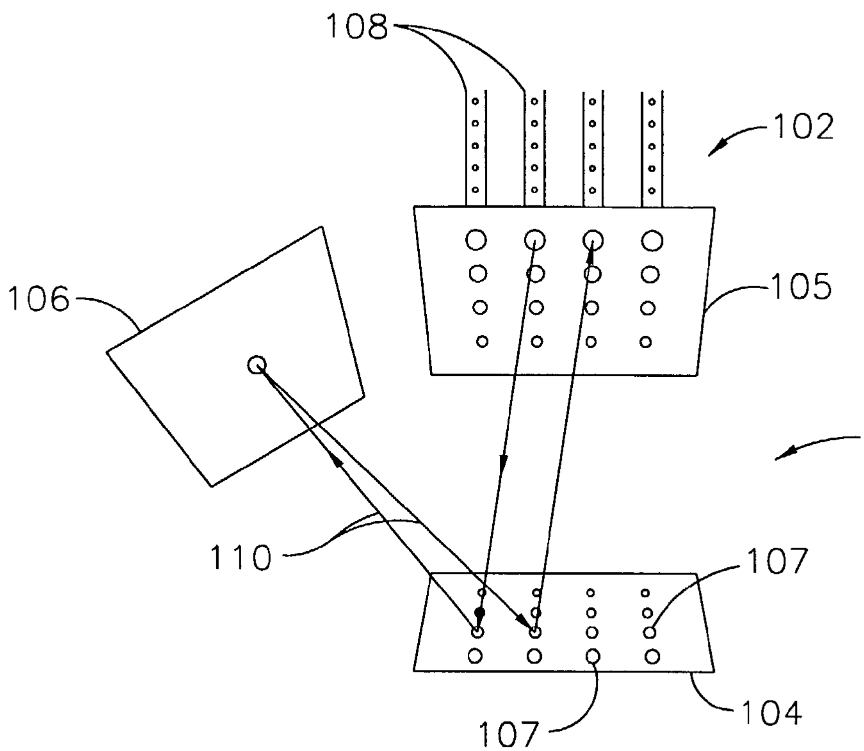
FIG. 1 is a schematic diagram of an optical cross connect switch.

FIG. 1 is a schematic diagram of an optical cross connect 100 showing a use of the present invention. Optical cross connect 100 switches communication signals from certain optical fibers in an array to other optical fibers in the array. Illustrated is an optical fiber array 102 comprising a plurality of optical fibers 108 held in place by an optical fiber connector 105. Typically optical fiber array 102 is a two dimensional array having columns and rows of optical fibers 108 held in place by optical fiber connector 105.

Also illustrated is a mirror array 104. Mirror array 104 comprises a two dimensional array of individual mirrors 107. Each mirror 107 of mirror array 104 can be moved to help direct light to the proper location. Mirror array 104 is preferably manufactured using Micro Electronic Manufacturing System (MEMS) technology. Mirror array 104 of this design is manufactured by Lucent Technologies. A reflector 106 is also provided. Reflector 106 is a plane mirror operable to direct light to and from the mirrors 107 of mirror array 104.

In operation, communication signals 110 in the form of modulated beams of light are transmitted along certain optical fibers 108 in optical fiber array 102. The communication signals 110 exit an optical fiber 108 in optical fiber array 102 and are directed by a mirror 107 in mirror array 104 to reflector 106 and from reflector 106 back to another mirror 107 in mirror array 104. The communication signal 110 is then reflected back to a different optical fiber 108 in fiber array 102. In this manner communicational signals 110 carried by optical fibers 108 can be switched from one optical fiber 108 to another optical fiber 108 without converting the optical signals to electrical signals. The optical fibers 108 must be held together closely with each optical fiber 108 aligned with a high degree of accuracy so the communication signals 110 can be switched from one optical fiber 108 to another. Thus the array connector 105 needs to be able to hold the optical fibers 108 securely together and at precise alignment.

Figure 2:
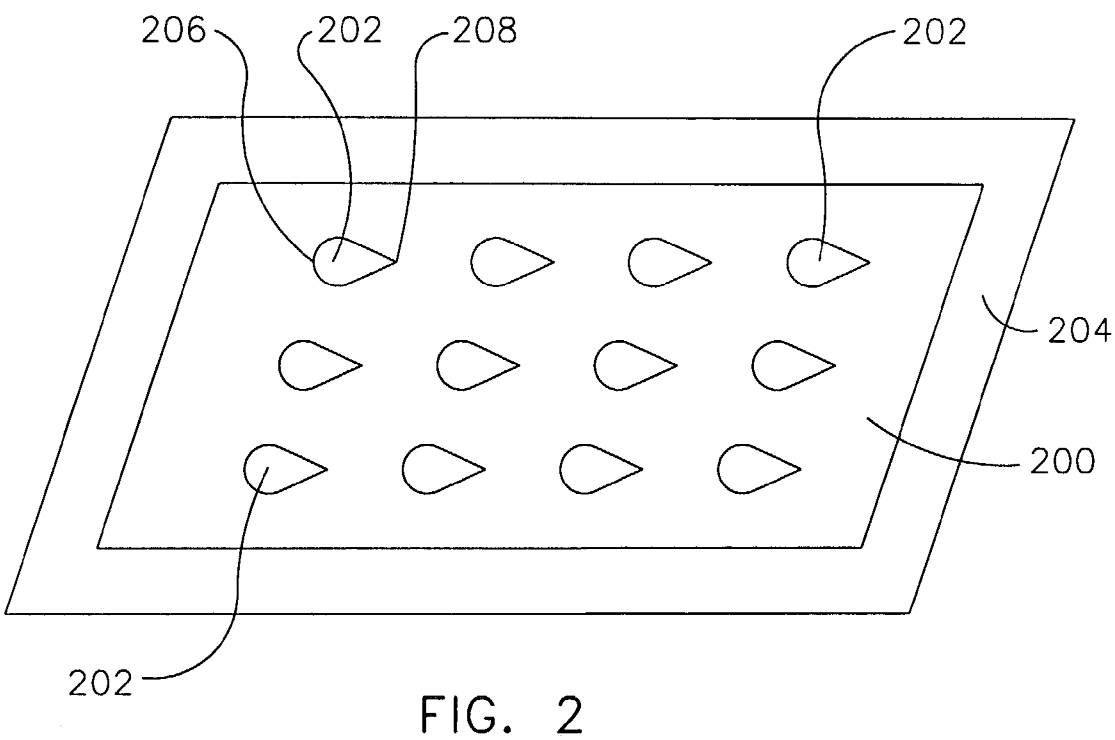
FIG. 2 is a view of an optical fiber faceplate.

FIG. 2 is a view of an optical fiber faceplate 200 for use in array connector 105. Faceplate 200 has a plurality of openings 202 formed on the surface of the optical fiber faceplate 200. FIG. 2 illustrates a 3 by 4 array of openings 202. However, any number of openings 202 can be formed on faceplate 200 in any one of numerous arrangements. Openings 202 extend completely through faceplate 202. The number and arrangement of openings 202 is for illustration purposes only.

Faceplate 200 is preferably made from a material such as silicon or silicon dioxide. The thickness of the faceplate is selected to maximize the strength of the faceplate while minimize cost of manufacturing. In one embodiment, faceplate 200 is approximately 0.4 millimeters thick. Openings 202 are formed in faceplate 200 using conventional techniques such as conventional photolithographic techniques to form the shape of the openings followed by deep reactive ion etching to form the openings. Deep reactive ion etching produces uniform trenches while preserving the openings 202 sidewall integrity. For ease of handling, faceplate 200 may be placed in a housing 204, manufactured from stainless steel or similar material.

Openings 202 in one embodiment are essentially teardrop in shape with a rounded side 206 and a v-shaped side 208. Other shapes can also be used. Opening 202 is large enough to accept an optical fiber 108. In order to accommodate a typical optical fiber 108 having a diameter of 125 μm, opening 202 can be at least 300 μm in diameter. FIG. 2 shows one faceplate 200 to be used in array connector 105. At least two faceplates are required to actually form array connector 105, as will be discussed in conjunction with the following figures.

Figure 3:
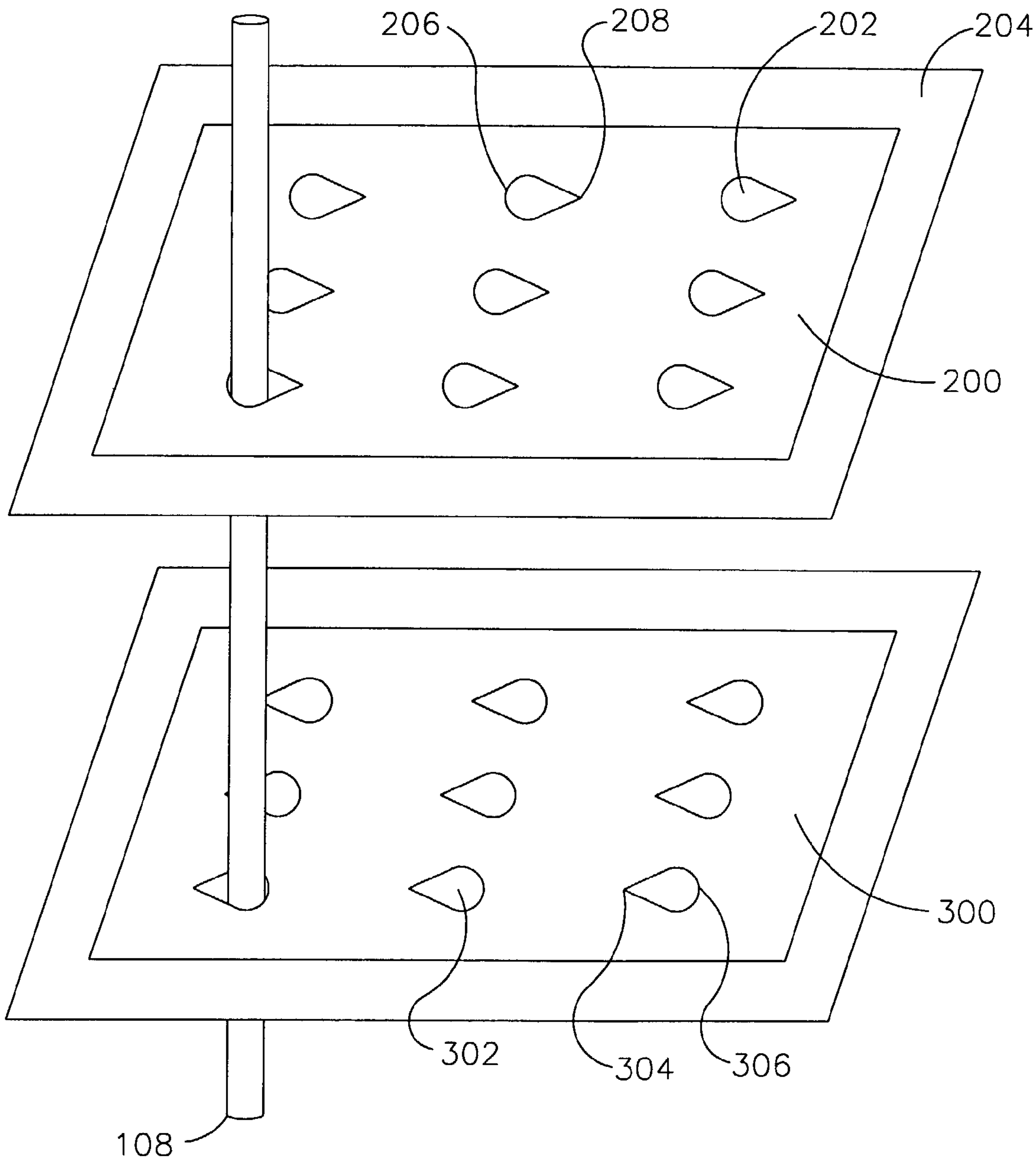
FIG. 3 is an exploded view of two faceplates stacked on top of each other.

FIG. 3 is an exploded view of two faceplates stacked on top of each other to form array connector 105. Top faceplate 200 has openings 202 with the v-shaped side 208 oriented in a first direction. In FIG. 3 the v-shaped side 208 is pointing to the right. Bottom faceplate 300 has openings 302 with a v-shaped side 304 oriented in a second direction. The second direction is one hundred and eighty degrees rotated from the first direction. In FIG. 3 v-shaped side 304 is facing to the left. These two faceplates 200 and 300 and the optical fibers 108 that are held in by the faceplates form the optical fiber array 102. Initially the faceplates 200 and 300 are aligned such that the rounded 206 and 306 portions overlap. This allows for optical fiber 108 to be inserted through openings 202 and 302. In one embodiment, robotically controlled tweezers are used to pull optical fibers 108 through openings 202 and 302. Prior to insertion, optical fibers 108 can be prepared for use by being cut to length and stripped of the jacket, yarn and buffer material to expose the optical fibers' cladding.

The faceplates 200 and 300 are designed to move in relation to each other in order to secure optical fibers 108 by clamping the optical fibers 108 against a side of the openings 202 and 302, such as against the v-shaped sides 208 and 304. In one embodiment, bottom faceplate 300 moves while top faceplate 202 is held in place. Or, the order of movement can be reversed. Alternatively both faceplates can be moved in opposite directions. Movement can be accomplished by a conventional robotic system attached to the faceplates 200 and 300.

Figure 4:
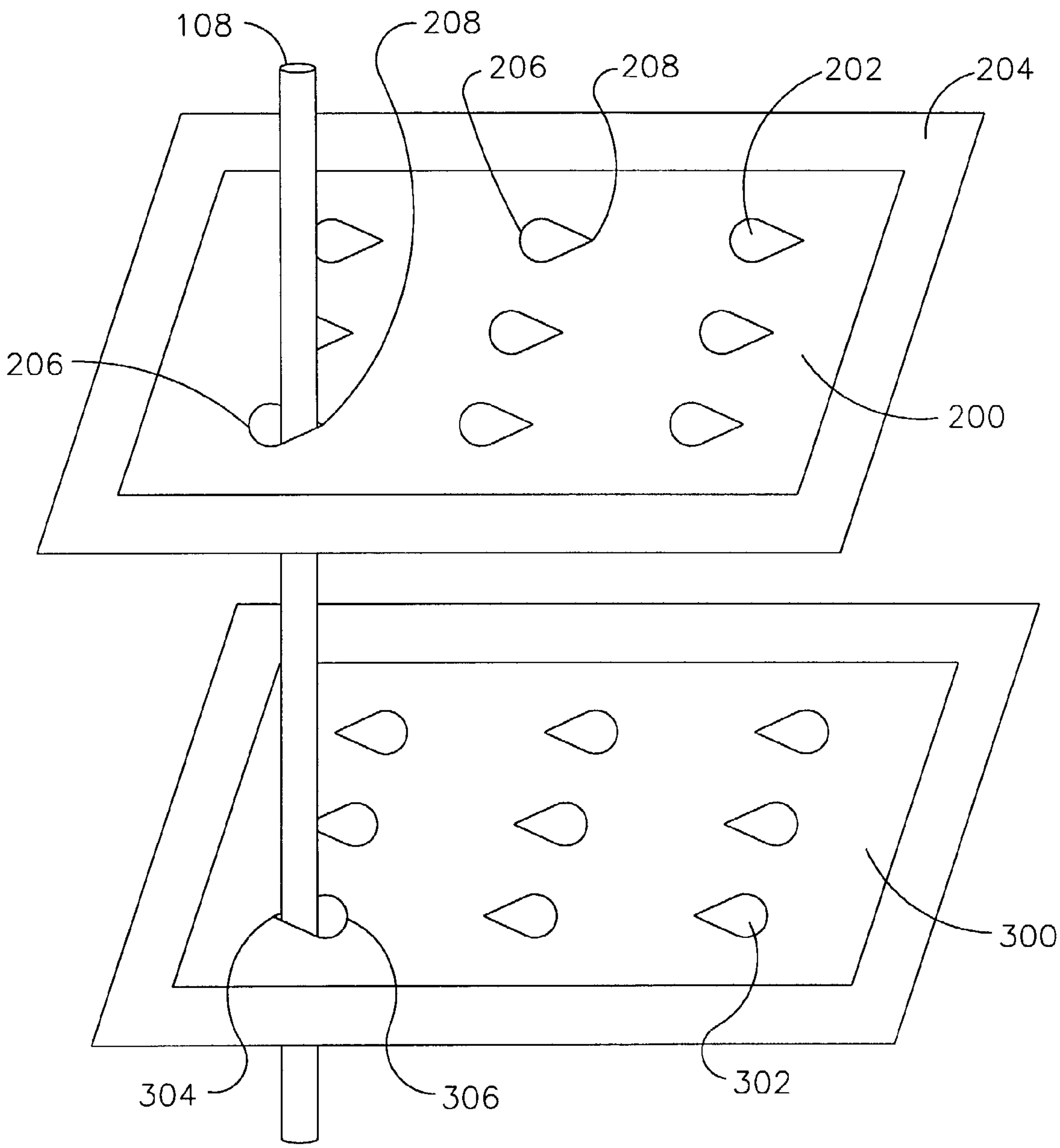
FIG. 4 is an exploded view of stacked faceplates in final alignment to secure the optical fiber.

FIG. 4 is an exploded view of stacked faceplates 200 and 300 in final alignment to secure optical fibers 108. To achieve the final alignment, top faceplate 200 and bottom faceplate 300 are moved relative to each other such that sides of openings 202 and 302 contact optical fiber 108, holding the optical fiber securely. In one embodiment, the v-shaped side 208 of opening 202 and the v-shaped side 304 of opening 302 contact the optical fiber 108 to securely hold optical fiber 108. Using the v-shaped sides 208 and 304 to contact optical fiber 108 is advantageous because a larger area of the sides of the openings 202 and 302 will contact optical fiber 108, holding the optical fiber 108 securely. In this secured configuration, v-shaped side 208 of opening 202 and v-shaped side 304 of opening 302 both contact the optical fiber 310 and hold the optical fiber 108 tightly in place.

Figure 5:
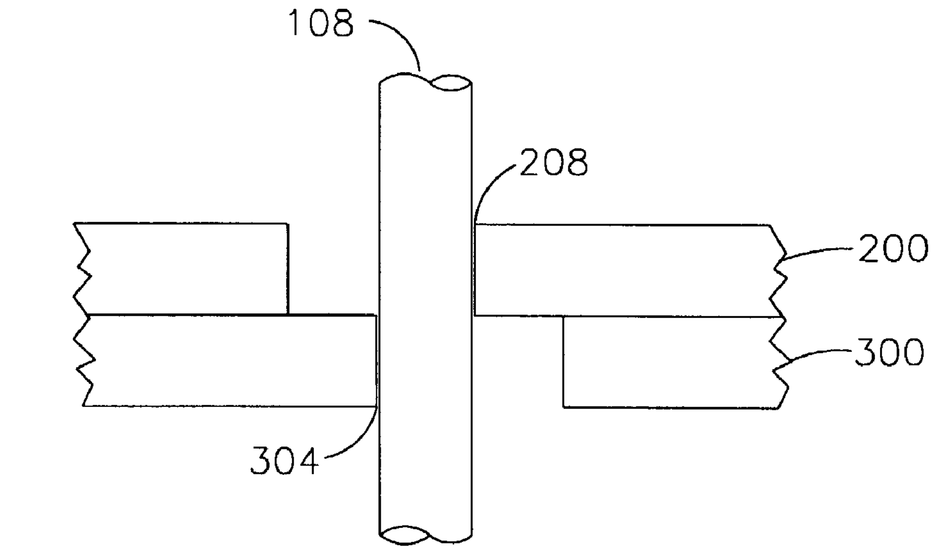
FIG. 5 is a cross sectional view of a top faceplate and bottom faceplate holding an optical fiber in position.

FIG. 5 is a cross sectional view of top faceplate 200 and bottom faceplate 300 holding optical fiber 108 in position. The v-shaped side 208 of top plate 200 is contacting optical fiber 108 and v-shaped side 304 of bottom faceplate 300 is also contacting optical fiber 108.

After optical fiber 108 is held in position, conventional glue, such as an ultra-violet light curable epoxy can be applied to further hold optical fibers 108 in position. The fiber array connector 105 is then leveled by cutting any extending optical fiber 108 flush with top faceplate 200. After that, faceplate 200 and ends of optical fibers 108 can be polished using conventional means. Additionally optimal coatings may be applied.

Figure 6:
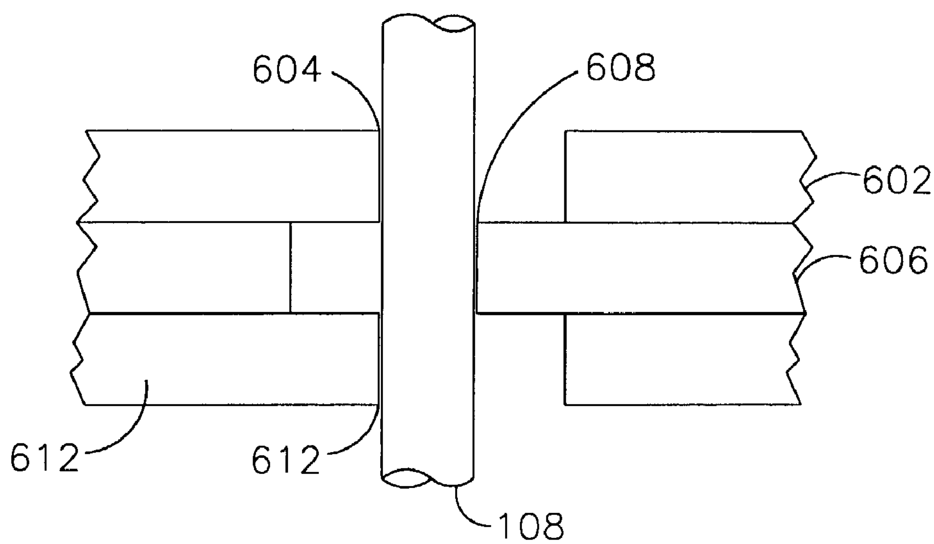
FIG. 6 is a cross section of an embodiment using three faceplates to hold optical fibers.

FIG. 6 is a cross section of a fiber array connector 105 in an embodiment using three faceplates. Top faceplate 602 is aligned such that the v-shaped area 604 that contacts optical fiber 108 is on the left. Middle faceplate 606 is oriented in the opposite direction with the v-shaped area 608 that contacts the optical fiber facing to the right. Bottom faceplate 610 is aligned in the same direction as top faceplate 602. This embodiment provides for a tighter hold on fiber optic 108 then a two-plate embodiment. In this embodiment, middle plate 606 can be moved while top plate and bottom plate 602 and 610 are held in position. Alternatively, top and bottom plate 602 and 610 can be moved relative to a stationary middle plate 606. Or top plate 602 and bottom plate 610 can be moved in one direction while middle plate 606 is moved in the opposite direction. The plates can be moved by a robotic system. While embodiments employing two faceplates and three faceplates have been illustrated, any number of faceplates can be used to secure optical fiber 108.

Figure 7:
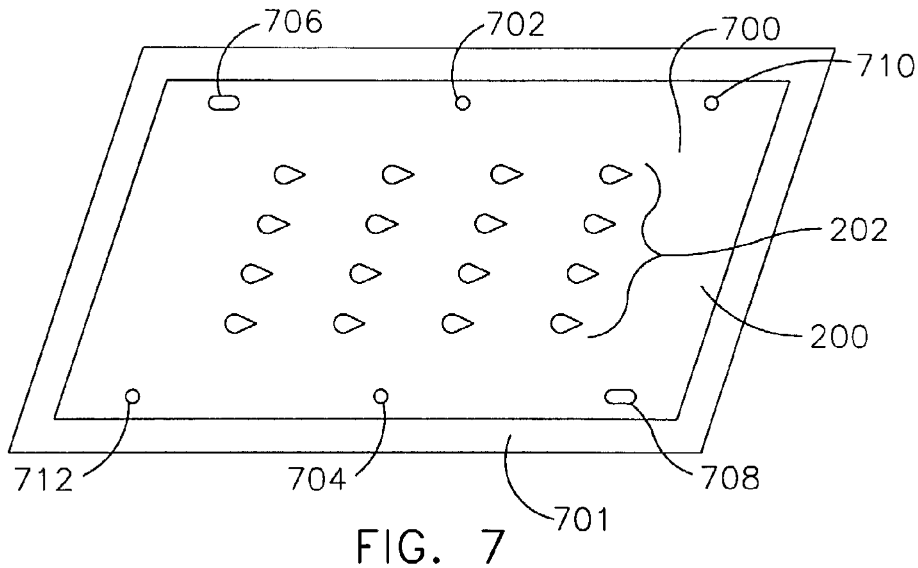
FIG. 7 is a plan view of a faceplate having alignment holes for ease of clamping an optical fiber.

FIG. 7 is a plan view of a faceplate 700 having alignment holes for ease of clamping optical fibers. Faceplate 700, in this embodiment, includes a number of holes formed on the faceplate 700. These include clamping holes 702 and 704. Also included are two elongated adjustment holes 706 and 708 at two of the corners of faceplate 700. Round alignment holes 710 and 712 are located in the other two corners. For example, in FIG. 7 elongated adjustment holes 706 and 708 are located in the upper left and lower right corner. Round alignment holes 710 and 712 are located in the upper right and lower left corner. Clamping holes 702 and 704 are located in the middle at the faceplate. The location of clamping holes and alignment holes may be varied. In one embodiment clamping holes 702 and 704, adjustment holes 706 and 708 and alignment holes 710 and 712 are formed in the faceplate.

Figure 8A:
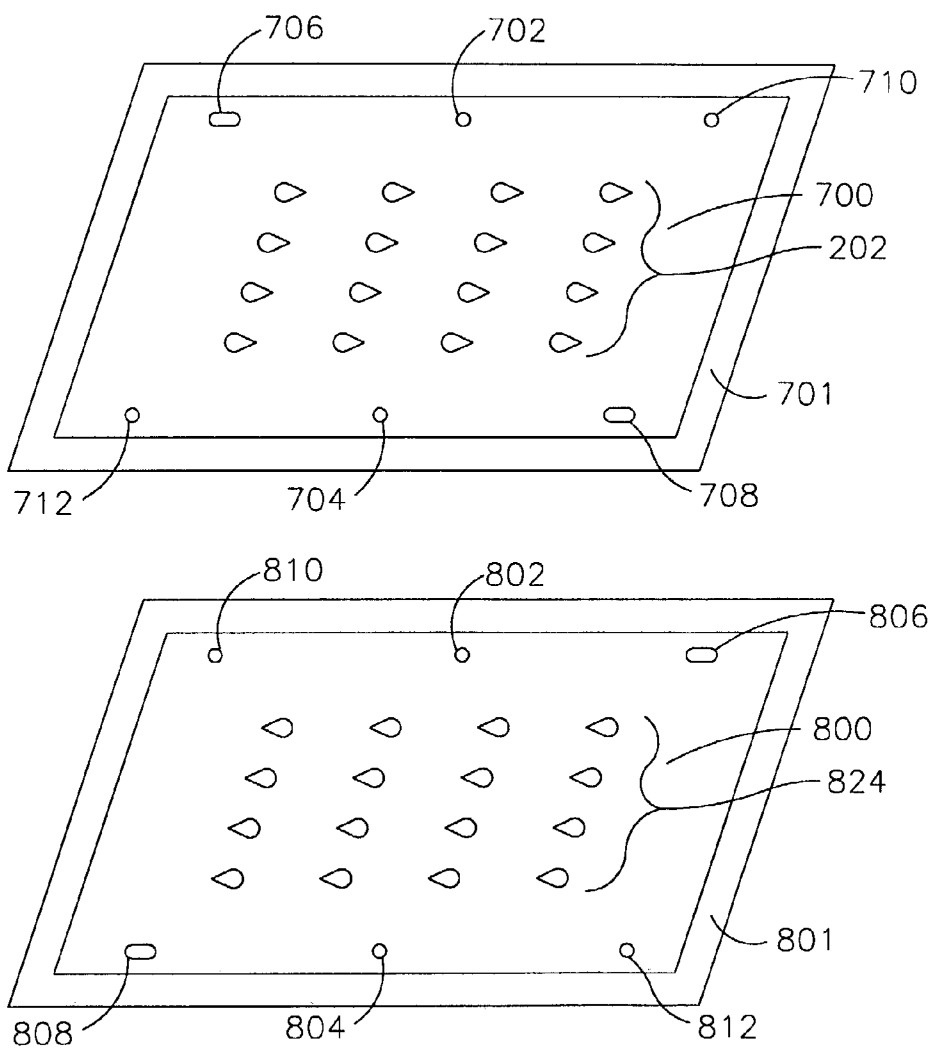
FIG. 8*a* is an exploded view of an array connector.

In operation, for the two-faceplate embodiment shown in FIG. 8*a*, the top faceplate 700 is aligned in a first alignment with elongated holes 706 and 708 in the upper left corner and the lower left corner. Bottom faceplate 800 is aligned in a second alignment with the elongated holes 806 and 808 of bottom faceplate 800 being located in the top right and bottom left of bottom faceplate 800. The second alignment can be achieved by turning over a faceplate oriented in the first alignment. The top faceplate 700 can also be in the second alignment as long as the bottom faceplate 800 is in the first alignment. As before, there are a number of openings 202 and 824 in the in top faceplate 700 and bottom faceplate 800. By having two faceplates in two different alignments, in embodiments having openings with v-shaped sides, the v-shaped side will be at different ends of the openings between the two faceplates.

Figure 8B:
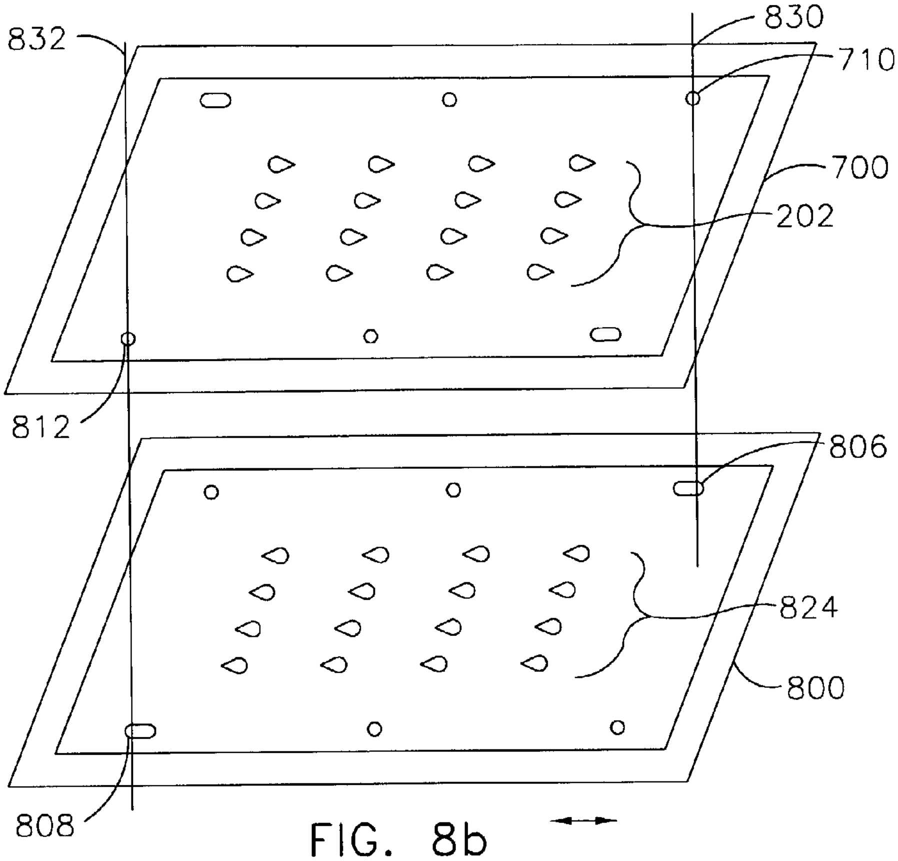
FIG. 8*b* is an exploded view of an array connector showing the adjustment of the faceplates.

FIG. 8*b* is an exploded view of an array connector showing the movement of a faceplate. Alignment pins 830 and 832 can be inserted through alignment hole 710 and elongated adjustment hole 806 and alignment hole 712 and elongated adjustment hole 808 respectively. This locks top faceplate 700 in place while bottom faceplate 800 can be moved a short distance because of the elongated shape of adjustment holes 806 and 808. The bottom faceplate 800 is moved to secure optical fibers (not shown in this picture) against the sides of openings 202 and 824.

Figure 8C:
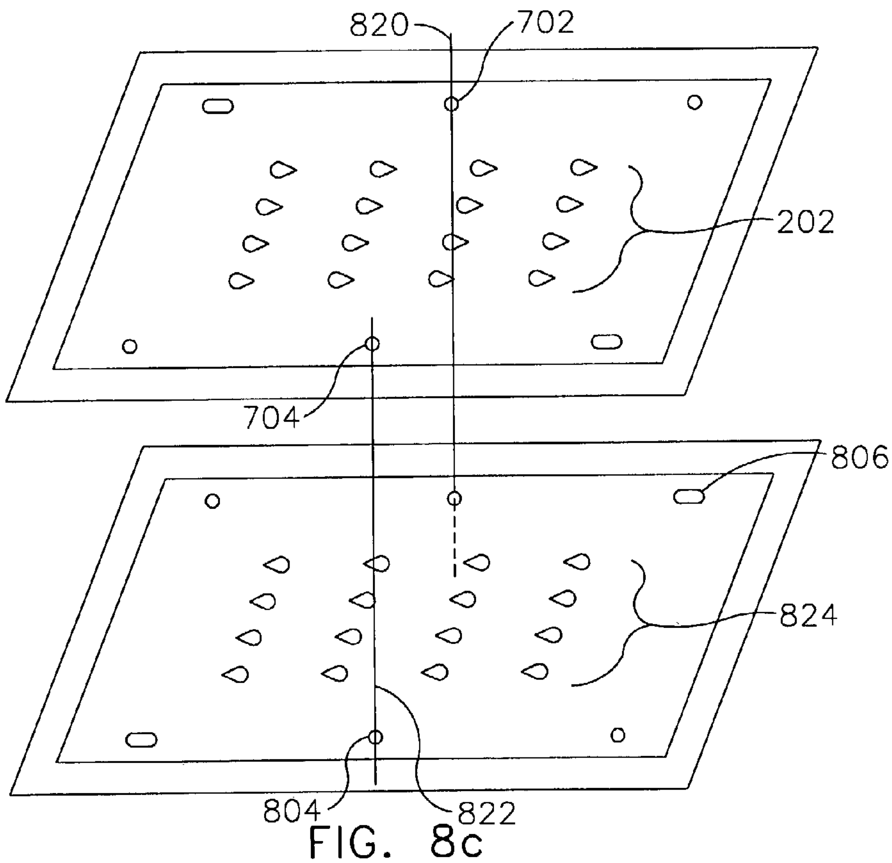
FIG. 8*c* is an exploded view of an array connector showing the securing of the faceplates.

FIG. 8*c* shows top faceplate 700 and bottom faceplate 800 using clamping holes 702, 704 and 802, 804. Clamping pin 820 and 822 are inserted through top faceplate 700 and bottom faceplate 800, after the optical fibers 108 are inserted through the openings 724 and 824 and the faceplates 700 and 800 are aligned to secure optical fiber 108.

Figure 8D:
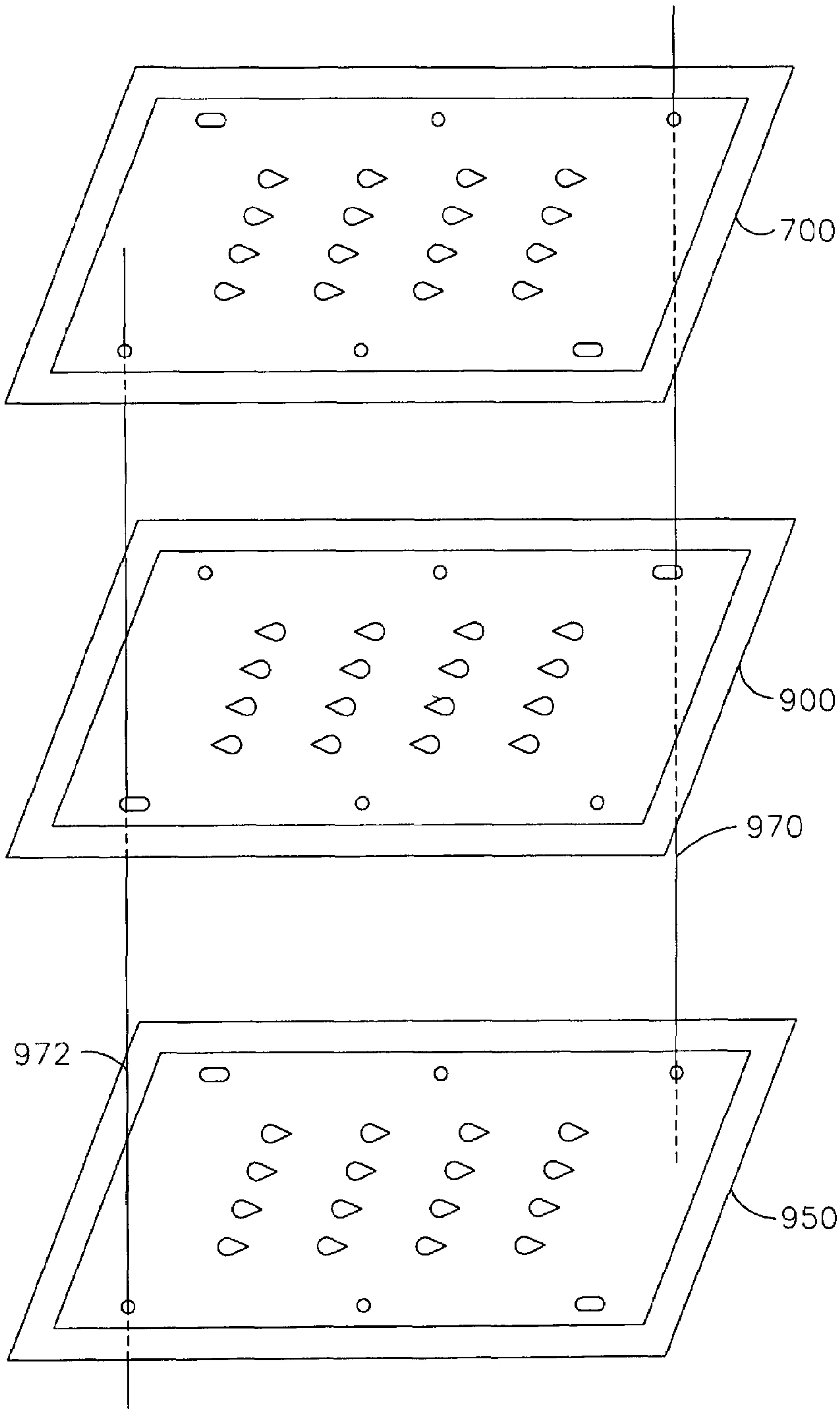
FIG. 8*d* is an exploded view of an array connector having three faceplates showing the adjustment of the faceplates.

FIG. 8*d* illustrates an embodiment with three faceplates. Illustrated are a top faceplate 700, a middle faceplate 900 and a bottom faceplate 950. Middle faceplate 900 is aligned in the opposite direction of top faceplate 700 and bottom faceplate 950. In this embodiment, when pins 970 and 972 are inserted, middle plate 900 can move in order to secure optical fibers 108.

Having now described preferred embodiments of the invention modifications and variations may occur to those skilled in the art. The invention is thus not limited to the preferred embodiments, but is instead set forth in the following clauses and legal equivalents thereof.

What is claimed:

1. A fiber optic array connector comprising:

a first faceplate having a plurality of openings, the first faceplate oriented in a first direction;

a second faceplate having a plurality of openings, the second faceplate oriented in a second direction;

a third faceplate oriented in the same direction as the first faceplate, the second faceplate placed between the first faceplate and the third faceplate;

a plurality of optical fibers, each of the plurality of optical fibers inserted through one of the openings in the plurality of openings in the first faceplate and one of the openings in the plurality of openings in the second faceplate; and wherein at least one of the second faceplate and the first faceplate is adjusted such that each optical fiber is held in place by radially contacting a portion of the axis of each fiber with a portion of one of the openings in the plurality of openings in the first faceplate and a portion of one of the openings in the plurality of openings in the second faceplate.

2. The fiber optic array connector of claim 1 wherein the openings are teardrop in shape with a rounded end and a v-shaped end.

3. The fiber optic array connector of claim 2 wherein the optical fibers are contacted by the v-shaped ends of the openings.

4. The fiber optic array connector of claim 1, wherein at least one of the first faceplate and the second faceplate is placed in a housing.

5. The fiber optic array connector of claim 1, wherein the first faceplate and the second faceplate have adjustment holes to help align the first and the second faceplates.

6. The fiber optic array connector of claim 1, wherein the first faceplate and second faceplate have clamping holes to secure the first faceplate and the second faceplate after the first faceplate and second faceplate are adjusted to hold the optical fibers in place.

7. A method for forming a connector for an optical fiber array comprising:

providing a first faceplate having a plurality of openings, the first faceplate oriented in a first direction;

providing a second faceplate having a plurality of openings, the second faceplate oriented in a second direction;

providing a third faceplate oriented in the same direction as the first faceplate;

stacking the first faceplate over the second faceplate, said stacking further comprising stacking the second faceplate between the first faceplate and the third faceplate;

inserting a plurality of optical fibers through the plurality of openings in the first faceplate and the plurality of openings in the second faceplate; and adjusting at least one of the second faceplate and the first faceplate to radially contact a portion of the axis of each optical fiber with a portion of one of the plurality of openings in the first faceplate and a portion of one of the plurality of openings in the second faceplate.

8. The method of claim 7 wherein the plurality of openings are teardrop in shape with a rounded end and a v-shaped end.

9. The method of claim 8 wherein the step of adjusting further comprises adjusting at least one of the second faceplate and the first faceplate such that the v-shaped ends in the openings in the first faceplate and the v-shaped ends in the openings in the second faceplate contact and hold the optical fibers.

10. The method of claim 7 further comprising the step of placing the first faceplate and second faceplate in a housing.

11. The method of claim 7 wherein the step of adjusting the first faceplate and the second faceplate further comprises using adjustment holes formed on the first faceplate and the second faceplate to align the first faceplate and the second faceplate.

12. An optical cross connect for switching a modulated beam of light from one optical fiber to another optical fiber, the optical cross connect comprising:

a fiber optic array having a plurality of optical fibers;

an array of mirrors optically coupled to the fiber optic array for directing the modulated beam of light to and from one or more of the plurality of optical fibers;

a reflector optically coupled to the array of mirrors to direct the modulated beam of light from a mirror in the array of mirrors to another mirror in the array of mirrors; and an optical array connector for retaining the optical fibers, the optical array connector comprising:

a first faceplate having a plurality of openings, the first faceplate aligned in a first direction;

a second faceplate having a plurality of openings, the second faceplate aligned in a second direction;

a third faceplate oriented in the same direction as the first faceplate, the second faceplate placed between the first faceplate and the third faceplate;

each optical fiber of the plurality of optical fibers being inserted through one of the plurality of openings in the first faceplate and one of the plurality of openings in the second faceplate; and wherein at least one of the first faceplate and the second faceplate is adjusted such that each optical fiber is secured by radially contacting a portion of the axis of each fiber with a portion of one of the plurality of openings of the first faceplate and a portion of one of the plurality of openings of the second faceplate.

13. The cross connect of claim 12 wherein the openings are teardrop in shape with the teardrop having a rounded end and a v-shaped end.

14. The cross connect of claim 13 wherein the optical fibers are contacted by the v-shaped ends of the openings.

* * * * *